United States Patent [19]
Turner

[11] 3,856,941
[45] Dec. 24, 1974

[54] ASTRINGENT GEL, ITS PREPARATION AND USE

[75] Inventor: Robert A. Turner, Greenwich, Conn.

[73] Assignee: Jack Sobel, Patchoque, N.Y.

[22] Filed: May 23, 1972

[21] Appl. No.: 256,039

[52] U.S. Cl.................. 424/145, 424/127, 424/131, 424/154
[51] Int. Cl......................... A61k 7/00, A61k 27/00
[58] Field of Search .......... 424/127, 131, 145, 154, 424/66, 67, 68

[56] References Cited
UNITED STATES PATENTS

| | | | |
|---|---|---|---|
| 2,906,668 | 9/1959 | Beekman | 424/66 |
| 3,009,769 | 11/1961 | Grote | 424/66 |
| 3,259,545 | 7/1966 | Teller | 424/68 |
| 3,471,624 | 10/1969 | Youngblood | 424/68 |

*Primary Examiner*—Sam Rosen
*Attorney, Agent, or Firm*—Erich M. H. Radde

[57] ABSTRACT

An astringent gel of a high concentration of astringent metal salts contains a mixture of an astringent aluminum salt and another astringent zinc, zirconium and-/or magnesium salt, a gelling agent, and if desired, an emollient polyhydroxy alcohol. The astringent metal salt concentration therein is lower than 18 % but sufficient to exert a skin tightening effect. The pH of said gel is about the same as the pH of the skin. The gel is stable and does not deliquesce even on prolonged storage. The gel is applied to the skin by spreading and is preferably covered by a textile layer such as a towel, a binder, or a mask.

13 Claims, No Drawings

ASTRINGENT GEL, ITS PREPARATION AND USE

BACKGROUND OF THE INVENTION

1. FIELD OF THE INVENTION

The present invention relates to a cosmetic gel and more particularly to astringent gels having unusual, and indeed, unique properties, to a process of preparing same, and to a method of using such gels.

2. DESCRIPTION OF THE PRIOR ART

It is well known that gelling agents are molecules whose structure or molecular properties permit a large number of water molecules to be held in a semi-bound state in the vicinity of the molecules of the gelling agent. When a sufficient body of water molecules is thus immobilized, that is, when they are not free to assume the usual molecular motion in a liquid, then a gel is formed. However, if salts, bases, or acids are present that also demand water molecules because they form hydrated ions, then the competition for water molecules may cause the molecules of gelling agent to be deprived of their water molecules, in which case the gel cannot form, or, if the ionic substances are added after the gel has formed, the gel may decompose.

Thus the formation of a gel in the presence of ionic substances creates a problem because of the opposition in the demand for water of two kinds of molecules.

Another problem in preparing a suitable astringent gel lies in the necessity of having the salts in the gel in a concentrated state. Unless astringent salts are highly concentrated, their astringent effect may be slight.

To those well versed in the preparation of gels, it is well known that it is difficult to form gels with most gelling agents in the presence of many ionic substances, and in particular it is impossible with most gelling agents to form a gel if the ionic substances are highly concentrated.

SUMMARY OF THE INVENTION

In principle the presence invention is based on the discovery of the proper use of a gelling agent in the presence of high concentrations of inorganic salts, so that a gel is formed, which is smooth to the touch so that it may be applied to the skin, is stable to moderate heat and cold, and is free of irritation. Finally a very important property of the gel is that it should have a strong astringent effect. Thus the gels according to the present invention have the remarkable action of causing an astringent effect on the skin when left in contact with the skin for periods of at least thirty minutes.

It is one object of the present invention to provide an astringent gel with the following physical, chemical, and biological properties:

Its pH-value is near that of the human skin.
It is of noteworthy stability and smoothness.
It is free from precipitate.
It does not deliquesce.
It does not irritate nor sensitize the skin.
It has a high astringent power.

Another object of the present invention is to provide a simple and effective process of producing such an astringent gel with the above-mentioned valuable properties.

A further object of the present invention is to provide a method of applying such an astringent gel to the human skin.

Other objects of the present invention and advantageous features thereof will become apparent as the description proceeds.

In principle the astringent gel according to the present invention is characterized by the following features.

1.

The astringent agents composing the gel are combinations or mixtures of astringent aluminum salts with the astringent salts of other metals, especially with salts of zirconium, zinc, and/or magnesium. Suitable aluminum salts are, for instance, aluminum chloride, alum, preferably ammonium alum, aluminum acetate, preferably in the form of Burow's solution, aluminum bromide, aluminum nitrate, or the like. Useful zinc salts are, for instance, zinc chloride, zinc sulfate, zinc nitrate, or the like. Preferred zirconium salts are zirconium chloride, zirconium acetate, zirconium bromide, zirconium nitrate, or the like. Magnesium salts which can be employed according to the present invention are magnesium chloride, magnesium bromide, magnesium acetate, magnesium sulfate, and the like. Such salts have a noteworthy astringent action on the skin and on the mucous membranes.

2.

Whereas aluminum salts have long been known to have astringent properties, it was found that it is important in forming an astringent gel, not to have only aluminum salts present. The presence of zinc or zirconium compounds enhances the gel-forming property of the gelling agent when salts are concentrated. Moreover, it is important not to have a large portion, or preponderance of alum present, even though it is a potent astringent. It is a less acidic aluminum salt, but is a less soluble salt, interfering with the solubility of other salts. Preferably the aluminum salts do not constitute more than about 80% of the solid residue after evaporation. When using alums, such as ammonium alum, it preferably constitutes not more than 35% of the solids.

3.

The gelling agents which have proved useful in the preparation of astringent gels according to the present invention are agents which are not affected and the gelling ability of which is not destroyed by the presence of high concentrations of inorganic salts and especially of salts having astringent properties, i.e. gelling agents with sufficient attraction for water so that the astringent salts do not prevent gelling. Especially suitable have proved to be polyvinyl alcohol and methyl cellulose. Polyvinyl alcohol having a molecular weight between about 10,000 and about 96,000 and containing up to 13% acetate groups and methyl cellulose of a molecular weight between about 13,000 and about 26,000 and a degree of substitution between about 1.3 and about 2.6 are the preferred agents although other gelling agents can also be used provided they can form a hydrated structure in solution with a minimum amount of water available.

4.

The amount of gelling agent should be sufficient to produce an astringent salt solution containing between about 1.0% and about 7.0% of the gelling agent. This amount depends upon the specific gelling agent used and is, of course, also dependent on the specific astringent salts employed.

5.

The amount of water in the preparation containing the gelling agent should be sufficient to yield a nongelling concentrated astringent salt solution having a solids content exceeding at least 18%. Preferably the amount of water in the sol is between about 70% and about 90% depending on the astringent salts and gelling agent used.

6.

The pH-value of the astringent solution containing the gelling agent is adjusted to a pH which does not have an irritating action on the skin, i.e. which is near or at the pH of the human skin (about 4.6). But it should not exceed a pH-value at which precipitation of the hydroxides of the astringent metals, for instance, of aluminum hydroxide takes place. The preferred pH-value is a pH between about 3.4 and about 4.0.

7.

The pH-value is adjusted to a pH between about 3.4 and about 4.0 by the addition of an alkalizing agent. The preferred alkalizing agent is an alkali metal hydroxide such as sodium hydroxide. Alkanolamines such as monoethanolamine or triethanolamine can also be used for adjusting the pH-value. Preferably the alkalizing agent is added slowly to the astringent metal salt solution which may or may not contain the gelling agent. Slow addition of the alkalizing agent is advisable so as to allow the flocculant precipitate that forms locally at the place of addition to completely dissolve.

8.

Preferably, but not necessarily, a polyhydroxy alcohol such as glycerol, propylene glycol, diethylene glycol, dipropylene glycol, and their monoethers or -esters are added to the resulting astringent salt solution or sol in order to impart thereto and to the resulting gel any desired degree of emolliency.

9.

The resulting sol of astringent metal salt, gelling agent, and, if required, alkalizing agent and emolliency-imparting agent is preferably prepared at elevated temperatures, for instance, at a temperature of at least 40°C. The sol is stable and can be stored for a prolonged period of time.

10.

It is converted by the addition of small amounts of water into the desired astringent gel to be applied to the skin.

11.

It is possible to determine by simple preliminary tests the preferred amounts and concentration of astringent metal salts and gelling agent in the resulting sol which will keep the salts in solution and will not cause gelation so that a stable, highly astringent sol is obtained by the addition of a relatively small amount of water.

The amount of water to be added can also readily be predetermined by simple preliminary tests. Usually the addition of an amount of water sufficient to decrease the astringent salt concentration to a concentration below about 18% causes gel formation on cooling. The lowest concentration consistent with good astringency is about 13%. It must be sufficient to allow hydration of the gelling agent. The amount of water to be added is, of course, dependent on the amounts of astringent salts and of gelling agent present in the sol and the type of salt and gelling agent used. Preferably the additional amount of water required for gel formation is added at elevated temperature and the gel is formed on cooling. Usually dilution of the astringent sol with about 20% of its volume of water is sufficient to form the desired gel.

The resulting astringent gel is stable, does not shrink, and does not release an aqueous solution, i.e. it does not deliquesce. This result is achieved according to the present invention.

a. when the astringent salt component is composed not only of an aluminum salt but contains also salts of zirconium, zinc, and/or magnesium;

b. when the aluminum salt is present in the salt mixture in the proper proportion with respect to the other metal salts, the lowest proportion of aluminum salt to other astringent salt being about 2:1, the highest proportion being about 5:1, and the preferred proportion being about 3.5:1;

c. when the gelling agent has a sufficient attraction to water to form a gel even at a high astringent salt concentration; and d. when the pH-value of the solution is a pH of at least 3.4, but does not exceed a pH of 4.0.

The resulting astringent gel which preferably has a pH of about 3.5 has a pronounced astringent and shrinking effect on the skin. Its application to the skin thus has a tightening effect on sagging or loose skin areas which are improved in contour. The gels impart to skin which has been subjected to considerable stress, such as the ageing skin, a youthful appearance and tightness, they eliminate wrinkles and dead epithelial residues, stimulate peripheral blood circulation, and have a favorable effect upon skin with dilated pores. They can, of course, also be used as highly effective deodorants and antiperspirants combining such effects with a skin tightening effect.

The gels according to the present invention are applied as such to the skin to be treated. It is also possible to impregnate pads of cloth or non-woven textile material with the sol and to form the gel by dilution with water within such textile material.

The gel may also be spread on a towel, a binder, a mask or the like, and such materials having the gel spread thereon are then applied to the skin to be treated. As stated above, the gel according to the present invention has a distinct astringent and shrinking effect on the skin without causing irritation or sensitization of the skin.

It is, of course, also possible to incorporate into the gels other agents compatible with the astringent metal salts such as perfumes and/or dyestuffs to provide odor and/or color thereto, antiseptic materials, hormones, especially estrogens, disinfectants, and others.

DESCRIPTION OF THE PREFERRED EMBODIMENTS

The following examples serve to illustrate the present invention of preparing a smooth gel with adequate astringency in a stable form which gel has the proper pH for application to the skin and the required chemical and biological properties as explained hereinabove. The present invention, however, is not limited to these examples.

EXAMPLE 1

100 g. of aluminum chloride, 50 g. of alum, and 50 g. of zinc sulfate are dissolved in 600 cc. of water while heating to about 50°C. and stirring. About 400 cc. of 2 N sodium hydroxide solution are added slowly thereto adjust the pH-value of the solution to a pH of 3.5. 30 g. of polyvinyl alcohol are dissolved in said solution while heating at about 50°C. and stirring. The resulting solution is diluted with water to a volume of 1000 cc. to yield a 20% solution of the astringent salts and a 3% solution of the gelling agent polyvinyl alcohol. It can be stored and remains fluid for an indefinite period of time.

On diluting the astringent solution with at least 150 cc. of water while stirring, and allowing the mixture to stand at room temperature, an astringent gel which can readily be spread on the skin is formed.

EXAMPLE 2

100 g. of ammonium alum, 300 g. of aluminum chloride, and 30 g. of zirconium chloride are mixed with each other. The mixture is dissolved in about 1400 cc. of distilled water while stirring and heating to about 40°C. 40 cc. of Burow's solution, i.e. about 2 g. of aluminum acetate are added thereto and the pH-value of the resulting solution is adjusted to a pH of 3.6 by adding gradually and slowly about 750 cc. of 15% aqueous monoethanolamine thereto, while heating and stirring the solution. Slow addition of the ethanolamine is important so that the flocculent precipitate which forms initially at the point of addition redissolves completely. Thereafter 100 cc. of glycerol and finally 160 g. of methyl cellulose sold under the trademark "Methocell 90 HG" are admixed while stirring and heating to 40°C. The resulting solution contains about 20.0% of the astringent salts and about 4% of the gelling agent.

In order to determine the amount of water to be added to cause gelling, an aliquot amount of the warm solution is mixed in portions with small amount of water and is allowed to cool after each addition. The amount of water required to cause gel formation is then calculated for the entire amount of solution. After the water has been added to the warm solution while stirring - in the present instance about 400 cc. of water - the diluted solution is poured into containers and is allowed to cool whereby gel formation takes place.

Care must be taken that the pH of the solution before gelling as well as that of the resulting gel does not exceed a pH of about 4.0.

If desired, a suitable perfume as well as a dyestuff can be admixed to the solution before the gelling agent is added.

EXAMPLE 3

160 g. of ammonium alum, 280 g. of aluminum chloride, 60 g, of zinc sulfate, 80 cc. of Burow's solution corresponding to 4 g. of aluminum acetate, and 1200 cc. of water are placed in a vessel, heated to 40°C., and stirred at said temperature until the salts are completely dissolved. 630 cc. of a 40% aqueous triethanolamine solution are added slowly thereto at said temperature while stirring to adjust the pH-value of the solution to a pH of 3.4. 300 cc. of propylene glycol and finally 150 g. of methyl cellulose sold under the trademark "Methocell 90 HG" are added thereto and the mixture is stirred at 40°C. until the methyl cellulose is dissolved completely.

600 cc. of water heated to 40°C. are added to the warm solution and the resulting mixture is poured into containers wherein it is allowed to cool. On cooling, the astringent gel is formed.

EXAMPLE 4

The amounts of astringent salts, water, pH-value adjusting agent, emollient, and gelling agent as well as the procedure are the same as given hereinabove in Example 3, whereby, however, the zinc sulfate is replaced by the same amount of magnesium sulfate. After dilution with water and cooling, a highly effective astringent gel is formed.

Of course, as stated above, other astringent aluminum, zinc, and zirconium salts than those used in the preceding examples can be employed. The zinc and zirconium salts can be replaced partly or completely by the same amounts of magnesium salts. Other alkalizing agents than those mentioned in the preceding examples can be employed provided they do not affect gelling of the resulting sol on subsequent dilution with water.

I claim:

1. In a process of preparing an astringent gel, the steps which consist essentially of
    a. preparing an aqueous solution of a mixture of an astringent aluminum salt and at least one other astringent metal salt selected from the group consisting of zinc salts, zirconium salts, and magnesium salts, the concentration of said mixture of astringent salts in said solution exceeding 18%,
    b. dissolving therein a gelling agent selected from the group consisting of polyvinyl alcohol having a molecular weight between about 10,000 and 96,000 and up to 13% acetyl groups and methyl cellulose having a molecular weight between about 13,000 and 26,000 and a degree of substitution between about 1.3 and 2.6 in an amount insufficient to form a gel in said concentrated salt solution but sufficient to yield a gel when the resulting sol of the mixture of astringent metal salts and gelling agent is diluted with water to a metal salt concentration below 18%,
    c. adjusting the pH of the solution obtained in step (a) or step (b) to a value which does not have an irritating effect on human skin but which is below the level at which hydroxides of the astringent metals precipitate,
    d. adding to said sol an amount of water sufficient to reduce the astringent metal salt concentration in said sol to a concentration lower than 18% but not substantially below 13% and
    e. allowing the diluted sol to stand to form the astringent gel.

2. The process of claim 1, in which steps (a), (b), (c) and (d) are carried out at elevated temperature and the diluted sol is cooled in step (d) to room temperature.

3. The process of claim 1, in which the pH-value of the sol obtained in steps (a) and (b) is adjusted in step (c) to a pH between about 3.4 and about 4.0.

4. The process of claim 1, in which the gelling agent is added to the aqueous solution of astringent aluminum salts and the other astringent metal salts in an amount between about 1.0 and about 7.0%.

5. The process of claim 1, in which an emollient polyhydroxy alcohol is added to the sol before gelling in step (d).

6. The process of claim 5, in which the emollient polyhydroxy alcohol is an alcohol selected from the group consisting of glycerol and propylene glycol.

7. In a process of preparing an astringent gel, the steps which consist essentially of
    a. preparing an aqueous solution of a mixture of an astringent aluminum salt selected from the group consisting of ammonium aluminum sulfate, aluminum chloride, aluminum acetate, aluminum bromide and aluminum nitrate and at least one other astringent metal salt selected from the group consisting of zinc chloride, zinc sulfate, and zinc nitrate, zirconium chloride zirconium acetate, zirconium bromide, and zirconium nitrate, and magnesium chloride, magnesium bromide, magnesium acetate, and magnesium sulfate, the aluminum salt content of said mixture of astringent aluminum salt and the other astringent metal salts being between about 35 and about 80%, the concentration of said mixture of astringent salts in said solution exceeding 18%, b. dissolving in said solution a gelling agent selected from the group consisting of polyvinyl alcohol having a molecular weight between about 10,000 and 96,000 and up to 13% acetyl groups and methyl cellulose having a molecular weight between about 13,000 and 26,000 and a degree of substitution between about 1.3 and 2.6 in an amount between about 1% and about 7% said amount being insufficient to form a gel in said concentrated salt solution but sufficient to yield a gel when the resulting sol of the mixture of astringent metal salts and gelling agent is diluted with water to a metal salt concentration below 18%, c. adjusting the pH-value of the resulting solution of astringent metal salts and gelling agent to a pH between about 3.4 and about 4.0, d. adding to said sol an amount of water sufficient to reduce the astringent metal salt concentration in said sol to a concentration lower than 18% but not substantially below 13%, and e. allowing the diluted sol to stand to form the astringent gel.

8. An astringent gel consisting essentially of water, an astringent aluminum salt selected from the group consisting of ammonium aluminum sulfate, aluminum chloride, aluminum acetate, aluminum bromide and aluminum nitrate and at least one other astringent metal salt selected from the group consisting of zinc chloride, zinc sulfate, and zinc nitrate, zirconium chloride, zirconium acetate, zirconium bromide, and zirconium nitrate, and magnesium chloride, magnesium bromide, magnesium acetate, and magnesium sulfate, the aluminum salt content of said mixture of astringent aluminum salt and the other astringent metal salt being between about 35% and about 80%, a gelling agent selected from the group consisting of polyvinyl alcohol having a molecular weight between about 10,000 and 96,000 and up to 13% acetyl groups and methyl cellulose having a molecular weight between about 13,000 and 26,000 and a degree of substitution between about 1.3 and 2.6, the concentration of said gelling agent in said gel being between about 1% and about 7% and the concentration of said astringent metal salts in said gel being lower than 18%, but not substantially below 13%, and an agent adjusting the pH-value of said gel to a pH which does not have an irritating effect on human skin but which is below the level a which hydroxides of the astringent metals precipitate, said gel being stable and non-deliquescent on prolonged storage.

9. The astringent gel of claim 8, additionally containing an emollient polyhydroxy alcohol.

10. In a method of restoring the structure of sagging and loose skin areas, the step comprising applying by spreading the astringent gel of claim 8 to such skin.

11. In a method of restoring the structure of sagging and loose skin areas, the step comprising applying by spreading the astringent gel of claim 9 to the skin.

12. The method of claim 10, in which the astringent gel is spread on the skin and is covered by a covering textile layer.

13. The astringent gel as defined in claim 8, wherein said pH is between about 3.4 and 4.0.

* * * * *

PO-1050
(5/69)

UNITED STATES PATENT OFFICE
CERTIFICATE OF CORRECTION

Patent No. 3,856,941            Dated December 24, 1974

Inventor(s) ROBERT A. TURNER

It is certified that error appears in the above-identified patent and that said Letters Patent are hereby corrected as shown below:

Page 1, following [73]: The word "Patchoque" should read -- Patchogue --.

Column 4, line 65: After "thereto" insert -- to --.

Column 7, line 10: After "35" insert -- % --.

Column 8, line 21: Change "a" to read -- at --.

Signed and sealed this 18th day of February 1975.

(SEAL)
Attest:

RUTH C. MASON
Attesting Officer

C. MARSHALL DANN
Commissioner of Patents
and Trademarks